United States Patent [19]

Hollander et al.

[11] Patent Number: 4,928,847
[45] Date of Patent: May 29, 1990

[54] APPARATUS FOR PACKAGING REFRIGERATED GOODS

[76] Inventors: David S. Hollander, 2083 Parson St., Brooklyn, N.Y. 11234; Mark S. Rubenstein, 208 Cinder Rd., Edison, N.J. 08820

[21] Appl. No.: 203,943

[22] Filed: Jun. 8, 1988

[51] Int. Cl.⁵ .................. B65D 77/00; B65D 30/00
[52] U.S. Cl. .................... 220/408; 220/441; 220/410; 220/450; 220/452
[58] Field of Search ............... 220/450, 452, 441, 408, 220/467, 902, 410, 468; 206/545

[56] References Cited

U.S. PATENT DOCUMENTS

| | | | |
|---|---|---|---|
| 2,031,254 | 2/1936 | Derr | 220/450 |
| 2,149,412 | 3/1939 | Bangs | 220/441 |
| 2,181,074 | 11/1939 | Scott | 220/452 |
| 2,496,296 | 2/1950 | Lobl | 206/545 |
| 2,794,588 | 6/1957 | George et al. | |
| 2,797,447 | 7/1957 | Winer | |
| 2,833,044 | 5/1958 | Johnson et al. | |
| 3,024,939 | 3/1962 | Kantor | 220/468 |
| 3,142,406 | 7/1964 | Kantor | 220/468 |
| 3,162,566 | 12/1964 | Katz | 220/452 |
| 3,236,206 | 2/1966 | Willinger | 220/441 |
| 3,391,056 | 7/1968 | Robinson, Jr. | |
| 3,445,052 | 5/1969 | Lewallen | 220/450 |
| 3,890,762 | 6/1975 | Ernst | 220/441 |
| 4,084,366 | 4/1978 | Saylor et al. | |
| 4,166,567 | 9/1979 | Beach, Jr. et al. | |
| 4,194,313 | 3/1980 | Downing | |
| 4,382,106 | 5/1983 | Royster | |
| 4,461,796 | 7/1984 | Fukahori et al. | |
| 4,465,725 | 8/1984 | Riel | |
| 4,682,708 | 7/1987 | Pool | 220/468 |
| 4,691,859 | 9/1987 | Snyder | |
| 4,730,748 | 3/1988 | Bane | 220/450 |

OTHER PUBLICATIONS

"Distribution Packaging" by Friedman and Kipnees Pub. 1977.

Primary Examiner—Stephen Marcus
Assistant Examiner—Stephen Castellano
Attorney, Agent, or Firm—Kane, Dalsimer, Sullivan, Kurucz, Levy, Eisele and Richard

[57] ABSTRACT

A chill box for shipping refrigerated goods formed of a plurality of insulating portions which are collapsible and have foiled surfaces and polyurethene foam inbetween. 45 degrees chamfers on each of the adjoining sides of each of the corners that are located between the panels of the portions to facilitate bending.

10 Claims, 4 Drawing Sheets

APPARATUS FOR PACKAGING REFRIGERATED GOODS

FIELD OF THE INVENTION

The present invention relates to a new and improved method and an apparatus for packaging refrigerated goods. In particular, the present invention relates to method and an apparatus for packaging goods such as fish which need to be refrigerated and which is subject to spoilage.

BACKGROUND OF THE INVENTION

Conventional means for packaging goods subject to spoilage such as fish includes packaging the goods in a bag, surrounding the goods with a refrigerant such as Gel-Pack which is then placed in a box with polystyrene insulation walls in order to retard the refrigerant from melting. The box is typically a corrugated type carton. One problem with this type of packaging is that the only insulation for the refrigerant is the polystyrene. Another problem is that the insulation boxes must be shipped inside the corrugated carton boxes and this takes up a considerable amount of space on the pallets. It is therefore preferable to be able to provide collapsible insulation boxes so that more of them can be stored on the pallets. In addition, the corrugated boxes can be shipped in their flat, unassembled form as well, thereby reducing shipping and storage costs significantly.

It is therefore desirable to provide a highly insulative packaging structure which is light weight, less costly for storage and shipping purposes, and which is reusable for further shipping.

SUMMARY OF THE INVENTION

Hence with the foregoing in mind, it is a principle object of the present invention to provide an apparatus for packaging refrigerated goods in light weight containers.

It is a further object of the invention to provide a method for manufacturing such containers.

It still another object of the invention to provide an effective insulating means for preserving goods in a refrigerated state, which are easy to assemble, lightweight, and can be shipped flat and unassembled for transportation purposes, and which permits the corrugated cartons to be similarly shipped.

In order to implement these and other objects of the invention, which will become more readily apparent as the description proceeds, the present invention provides a method and an apparatus for packaging refrigerated goods wherein the packaging structure is formed of collapsible, insulating surfaces having 45 degree chamfer on adjoining sides of indented corners to facilitate folding. Further, the packaging is preferably formed of three portions, each portion having an aluminum foil on its outer surfaces and a polyurethane foam disposed therebetween. The 90 degree chamfer for the corner fold permits each panel of each portion to unfold as part of the assembled package structure.

The present invention utilizes the inherent properties of aluminum foil.

The surface of aluminum foil has the ability not to absorb, but reflect up to 95% of the infrared rays which strike it. Very little heat conduction can take place when only 5% of the rays are absorbed. Therefore, as defined above, foil has low emissivity. Simply put, a foil surface will act as the most effective physical barrier to prevent heat transfer.

An air space can have a tremendous value as thermal insulation. The use of 2 foil surfaces (LOW EMISSIVITY) with an airspace in between will greatly modify the total heat transferred across the space between the foil surfaces, which is why walls and roofs are built with internal air spaces to retard heat flow by conduction, and astronauts wear suits of reflective foil surrounding trapped air.

Reflection and emissivity by surfaces can only occur in unobstructed space. The ideal space is any dimension ¾" or more. Where there is no air space at all, conduction through solids occurs; i.e., attach foil to a solid object such as a wall, and the foil will have no reflective insulation value at the point of contact. Temperature can be controlled more effectively by taking advantage of both the low thermal emissivity of foil and the low thermal conductivity of air.

BRIEF DESCRIPTION OF THE DRAWINGS

For a full understanding of the nature in the objects of the invention, reference should be had to the following detailed description, taken in connection with the accompanying drawings, in which.

DETAILED DESCRIPTION OF THE PREFERRED EMBODIMENT

Figure 1:
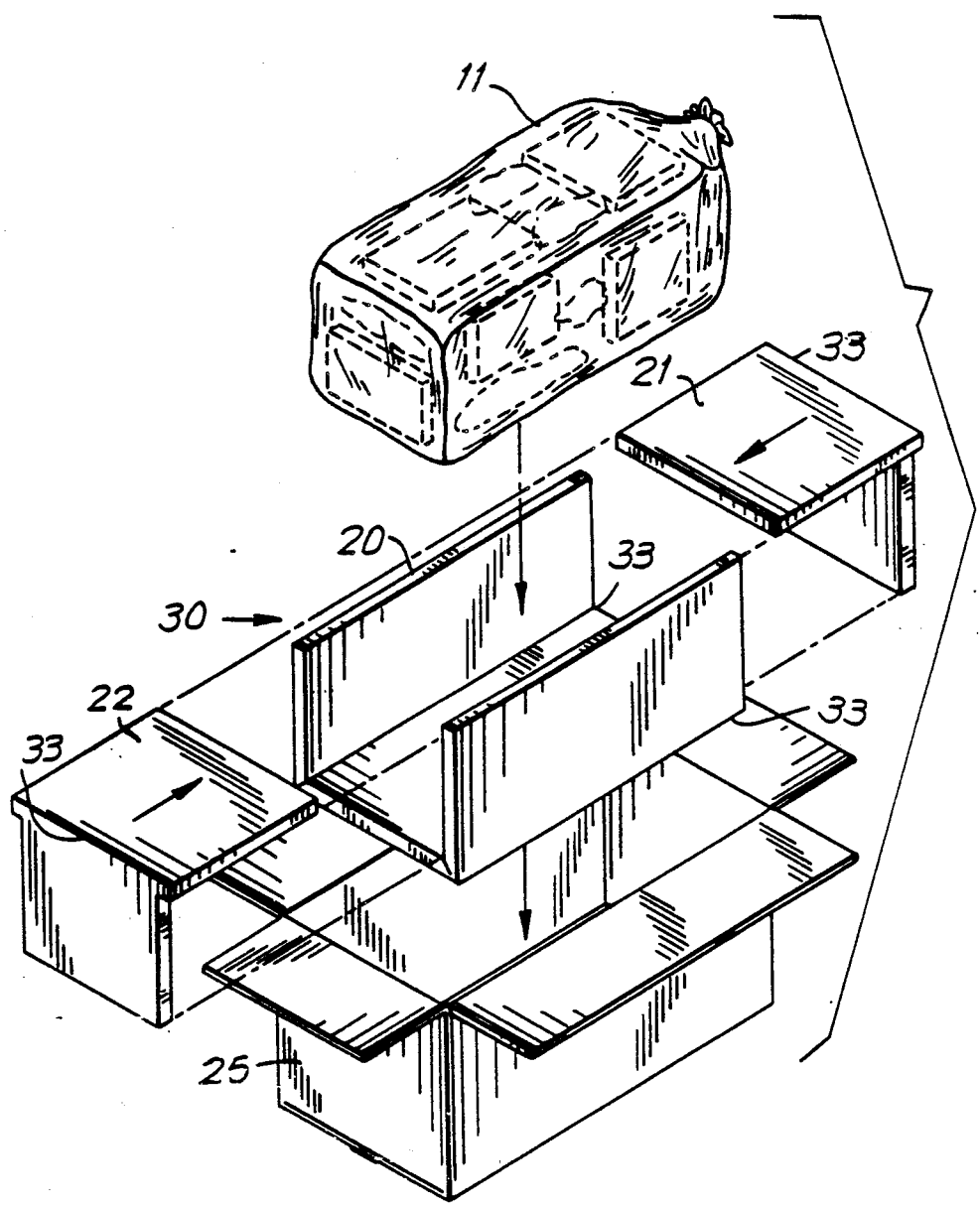
FIG. 1 is exploded perspective view in accordance with the teachings of the present invention.

Referring now to FIG. 1 of the drawings, the assembly 1 is shown in an exploded perspective view. Perishable goods, such as fish 3, are wrapped together with a blanket or bags of frozen refrigerant such as a Gel-Pack bag 10 and then placed in to the polyethylene bag 11. Bag 11 is a 3 mil plastic bag which is then placed inside the invention—chill box 30, which is formed of 3 portions: a main longitudinal portion 20 and two end portions 21 and 22. The chill box 30 is inserted into a corrugated RSC container 25. As can be seen in FIG. 1, each of the three portions 20, 21 and 22 are formed as a design as closable insulation portions which can be assembled snugly together to form a chill box 30.

Figure 2:
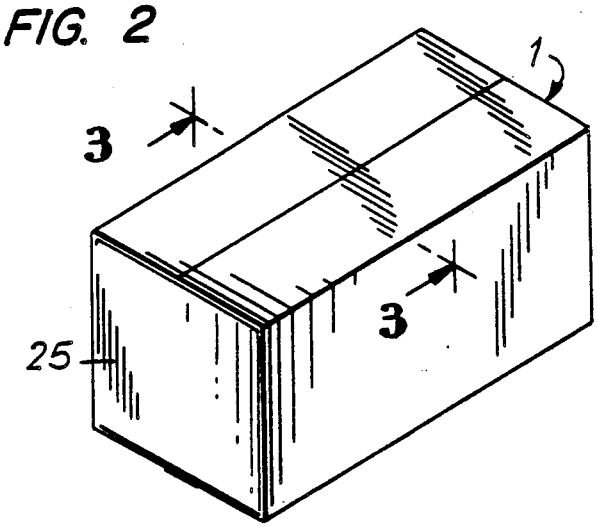
FIG. 2 is an assembled perspective view of FIG. 1.
Figure 3:
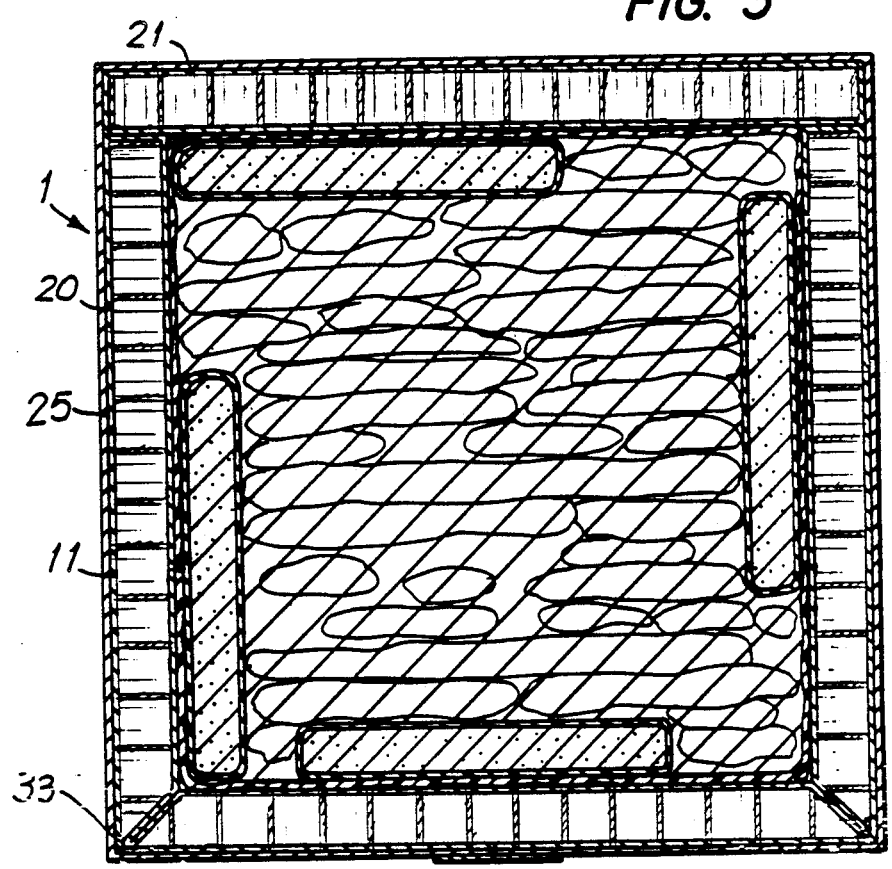
FIG. 3 is a sectional view along the lines 3—3 of FIG. 2

FIGS. 2 and 3 show the fully assembled package 1 in the corrugated RSC container 25 in perspective and sectional views.

Figure 4:
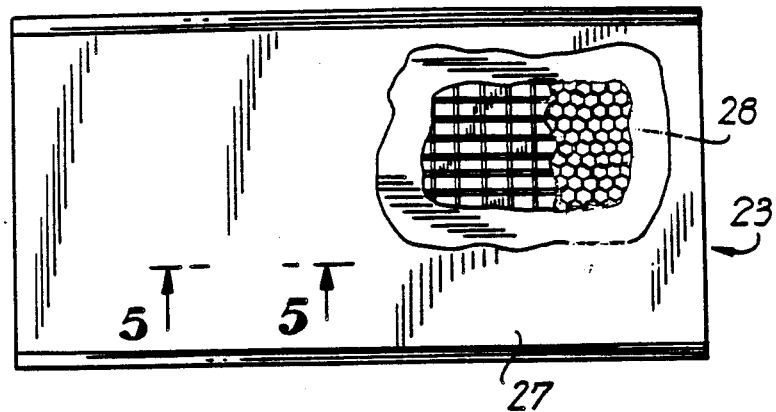
FIG. 4 is a plan view of a panel of the present invention showing a partial cutaway view.

FIG. 4 shows a panel 23 of one of the three portions 20, 21 and 22 of the chill box 30. The panel has foils 27 on its upper and lower surfaces and a polyurethane foam 28 sandwiched inbetween.

Each of the foils 27 is manufactured as a single sheet having an outer coating of polyethylene 34 and a aluminum foil 35 underneath that and on the other side of that a polypropylene webbing or mesh 36 which is covered by a coating of polyethylene 34. (See FIG. 5)

Figure 5:
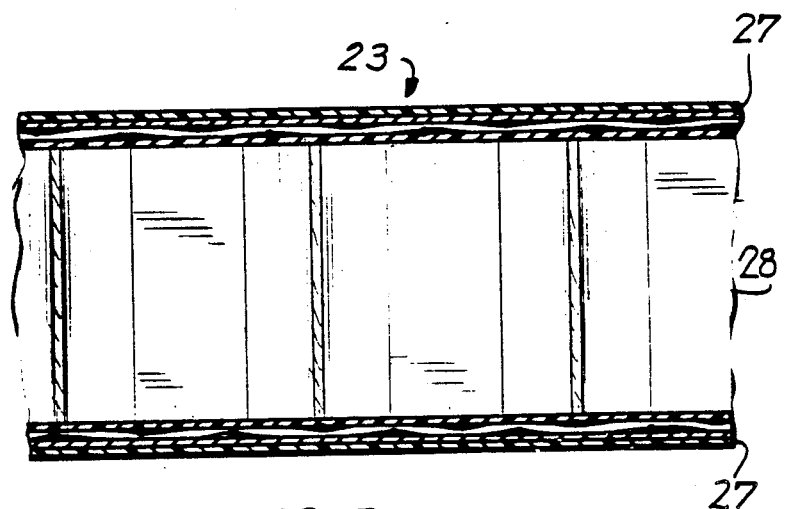
FIG. 5 is a sectional view along the lines 5—5 of FIG. 4.

The basic configuration of materials in the foil insulation shown in FIGS. 4 and 5 preferably consist of:

2 outer layers of low emissivity aluminum foil 35 reinforced by polypropylene webbing and laminated with polyethylene film.

321b low density "open cell" polymeric isocyanate foam 28.

The foam 28 is preferably injected as two liquid components and cures to a solid state at the time of compression between the 2 layers of foil. The result is a 1" honeycombed air space between the 2 layers of foil.

The foil 27 is commercially available and produced by several manufacturers, such as FOIL-FLEX, which is marketed by Energy Saver Imports, Inc. in Broomfield, Colo. It does not matter whether or not the side of the foil with the webbing on it faces the polyurethane foam surface. The cut away view of FIG. 4 illustrates the layers of foil 27.

Each of the portions, 20, 21 and 22 have 45 degree chamfers in each of the adjoining sides of the corners to facilitate folding about fold lines 33 as shown in FIG. 1.

Thus the present invention provides a collapsible foldable means for providing insulation which is an improvement by approximately a factor of 2 over that in the aforementioned art.

Figure 6:
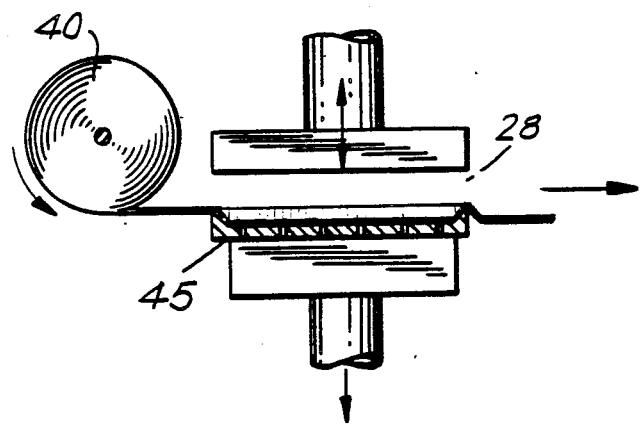
FIG. 6 shows a design view of the pocket forming fibers and insertion of foam.

FIG. 6 illustrates the method of manufacturing the chill box 30 in accordance with the teachings of the invention.

Foil 27 can be dispensed by a roller 40 onto a vacuum mold 45 where it is pulled down flatly onto the plane of the mold 45 by suction. Polyurethane foam 28 is dispensed on top of the foil 27. A preferable type of low density polyurethane foam would be INSTAFILL® manufactured by Sealed Air Corp. in Danbury, Conn.

After the foam is dispensed the second foil 27 layer is placed on top of the foam 28. This can then be sealed by thermal bonding means, heating, or any other conventionally known means. When the foam is in the cure state, an operator working at a second station is operating an automatic cutter and crimper (not shown) which would cut and seal the panel at the edges.

Figure 7:
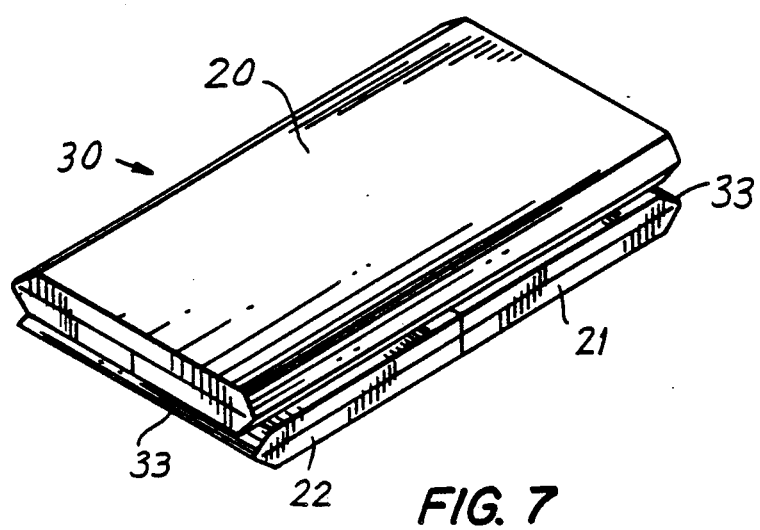
FIG. 7 is a perspective view of the three portions of the present invention folded up.

FIG. 7 shows the completed chill box 30 in folded condition ready for shipping.

We do not limit ourselves to any particular details or constructions set forth in this specification and illustrated in the accompany drawings, as the same refers to and sets forth only certain embodiments of the invention, and it is observed that the same may be modified without departing from the spirit and scope of the invention.

Having thus described the invention, what we claim is new and desire to be secured by Letters Patent is as follows:

1. A chill box adapted to provide insulated packaging for refrigerated goods, comprising:
   a plurality of separate portions, each portion having at least two panels and a bendable corner edge therebetween, each of said panels having foils on its top and bottom surfaces and covering its edges and an insulating material disposed therebetween to insulate refrigerated goods packaged within said chill box, said insulating material being formed by application of cured polyurethane foam to created air space between said foils.

2. A chill box according to claim 1 wherein there are three portions; a longitudinal portion having three panels, and two end portions each having two panels, which when assembled form a rectangularly shaped chill box.

3. A chill box according to claim 1 wherein said bendable corner edge has a 45 degree chamfer on each of its adjoining sides to facilitate folding.

4. A chill box according to claim 1 wherein each said foil is formed of a first layer of a polyethylene coating, a second layer of aluminum, a third layer of mesh wire and a fourth layer of a polyethylene coating.

5. A chill box adapted to provide insulated packaging for refrigerated goods, comprising:
   at least one portion having at least one foldable panel, said at least one panel having foils on its top and bottom surfaces and covering its edges and an insulating material therebetween to insulate refrigerated goods packaged with said chill box, wherein perishable goods are wrapped together with frozen refrigerant and placed into a bag and then placed into said chill box and said chill box is then inserted into a container thereby providing a highly insulative packaging structure for storage and shipping purposes.

6. A chill box according to claim 5 wherein there are three portions; a longitudinal portion having three panels, and two end portions each having two panels, which when assembled form a rectangularly shaped chill box.

7. A chill box according to claim 5 further comprising at least two said panels and a bendable corner edge therebetween having a 45 degree chamfer on each of its adjoining sides to facilitate folding.

8. A chill box according to claim 5 wherein said insulating material is formed by application of cured polyurethane foam to create air space between said foils.

9. A chill box according to claim 5 wherein each said foil is formed of a first layer of a polyethylene coating, a second layer of aluminum, a third layer of mesh wire and a fourth layer of a polyethylene coating.

10. A chill box according to claim 5 wherein said bag is a polyethylene bag.

* * * * *